(12) United States Patent
Wilson et al.

(10) Patent No.: US 10,775,527 B2
(45) Date of Patent: Sep. 15, 2020

(54) PERMANENT EM MONITORING SYSTEMS USING CAPACITIVELY COUPLED SOURCE ELECTRODES

(71) Applicant: HALLIBURTON ENERGY SERVICES, INC., Houston, TX (US)

(72) Inventors: Glenn Andrew Wilson, Singapore (SG); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/118,073

(22) PCT Filed: Mar. 25, 2014

(86) PCT No.: PCT/US2014/031731
§ 371 (c)(1),
(2) Date: Aug. 10, 2016

(87) PCT Pub. No.: WO2015/147800
PCT Pub. Date: Oct. 1, 2015

(65) Prior Publication Data
US 2016/0356911 A1    Dec. 8, 2016

(51) Int. Cl.
*G01V 3/20* (2006.01)
*E21B 47/125* (2012.01)
*E21B 49/00* (2006.01)

(52) U.S. Cl.
CPC .............. *G01V 3/20* (2013.01); *E21B 47/125* (2020.05); *E21B 49/00* (2013.01)

(58) Field of Classification Search
CPC ... G01V 3/18; G01V 3/20; G01V 3/22; G01V 3/24; G01V 3/26; G01V 3/265;
(Continued)

(56) References Cited

U.S. PATENT DOCUMENTS

RE21,797 E * 5/1941 Jakosky .................. G01V 3/24
                                                    324/355
5,043,668 A * 8/1991 Vail, III .................. G01V 3/24
                                                    324/368
(Continued)

FOREIGN PATENT DOCUMENTS

WO    2012/100217    7/2012
WO    2012177349 A1  12/2012
(Continued)

OTHER PUBLICATIONS

Bergmann, Peter et al., "Surface-Downhole Electrical Resistivity Tomography Applied to Monitoring of CO2 Storage At Ketzin, Germany", *Geophysics*, vol. 77, No. 6, Nov.-Dec. 2012, pp. B253-B267.
(Continued)

*Primary Examiner* — David M Schindler
(74) *Attorney, Agent, or Firm* — Gilliam IP PLLC

(57) ABSTRACT

An illustrative permanent electromagnetic (EM) monitoring system including a casing string positioned inside a borehole penetrating a formation, a source electrode attached to the casing string, an electrically insulating layer on an outer surface of the source electrode that provides a capacitive coupling of the source electrode to the formation, a power supply coupled to the source electrode which injects electrical current into the formation via the capacitive coupling, and a processing unit that determines a formation property based on at least the current received by a return electrode.

13 Claims, 3 Drawing Sheets

(58) Field of Classification Search
CPC ... G01V 3/28; G01V 3/30; G01V 3/32; G01V 3/34; G01V 3/36; G01V 3/38; G01V 3/40; G01V 5/04; G01V 5/045; G01V 5/06; G01V 5/08; G01V 5/085; G01V 5/10; G01V 5/101; G01V 5/102; G01V 5/104; G01V 5/105; G01V 5/107; G01V 5/108; G01V 5/12; G01V 5/125; G01V 5/14; G01V 5/145; G01V 11/002; G01V 11/005; G01V 11/007; G01V 2210/163; G01V 2210/6169; G01V 1/40; G01V 1/42; G01V 1/44; G01V 1/46; G01V 1/48; G01V 1/50; G01V 1/52; E21B 47/113; E21B 47/125; E21B 17/003; E21B 49/00; G01N 27/22; G01N 27/221
See application file for complete search history.

(56) References Cited

U.S. PATENT DOCUMENTS

| | | | |
|---|---|---|---|
| 5,642,051 A | 6/1997 | Babour et al. | |
| 5,732,771 A * | 3/1998 | Moore | E21B 17/003 166/65.1 |
| 6,534,986 B2 | 3/2003 | Nichols | |
| 6,731,114 B1 | 5/2004 | Lagabrielle et al. | |
| 6,961,601 B2 | 11/2005 | Matthews et al. | |
| 7,183,777 B2 | 2/2007 | Bristow et al. | |
| 7,446,535 B1 * | 11/2008 | Tenghamn | G01V 3/083 324/365 |
| 7,492,168 B2 | 2/2009 | Ogilvy et al. | |
| 7,673,682 B2 | 3/2010 | Daily | |
| 8,380,439 B2 | 2/2013 | Lagmanson et al. | |
| 2003/0038634 A1 | 2/2003 | Strack | |
| 2004/0178797 A1* | 9/2004 | Rioufol | E21B 17/1078 324/367 |
| 2004/0263175 A1 | 12/2004 | Chouzenoux et al. | |
| 2005/0206385 A1 | 9/2005 | Strack | |
| 2005/0285754 A1* | 12/2005 | Hall | E21B 17/028 340/855.1 |
| 2008/0303525 A1* | 12/2008 | Itskovich | G01V 3/24 324/351 |
| 2009/0243619 A1* | 10/2009 | Bespalov | G01V 3/24 324/355 |
| 2010/0013487 A1 | 1/2010 | Bloemenkamp | |
| 2010/0271030 A1 | 10/2010 | Reiderman et al. | |
| 2011/0083838 A1 | 4/2011 | Labrecque | |
| 2012/0090827 A1 | 4/2012 | Sugiura | |
| 2012/0111633 A1 | 5/2012 | Kumar | |
| 2012/0160473 A1* | 6/2012 | Sihler | E21B 17/1035 166/65.1 |
| 2012/0223717 A1 | 9/2012 | Labrecque | |
| 2012/0256634 A1* | 10/2012 | Morys | E21B 43/25 324/338 |
| 2012/0274329 A1* | 11/2012 | Tabarovsky | G01V 3/24 324/338 |
| 2012/0293179 A1 | 11/2012 | Colombo et al. | |
| 2013/0293235 A1 | 11/2013 | Bloemenkamp et al. | |

FOREIGN PATENT DOCUMENTS

| | | | |
|---|---|---|---|
| WO | WO-2012177349 A1 * | 12/2012 | E21B 47/102 |
| WO | 2015/147800 | 10/2015 | |

OTHER PUBLICATIONS

Bristow, Q. et al., "A New Temperature, Capacitive-Resistivity, and Magnetic-Susceptibility Borehole Probe for Mineral Exploration, Groundwater, and Environmental Applications", *Geological Survey of Canada*, Technical Note No. 3, doi: 10.4095/289197, (2011), 13 pgs.

Deceuster, John et al., "Automated Identification of Changes in Electrode Contact Properties for Long-Term Permanent ERT Monitoring Experiments", *Geophysics*, vol. 78, No. 2 (Mar.-Apr. 2013), (2011), pp. E79-E94.

Hibbs, A. D. et al., "Capacitive Electric Field Measurements for Geophysics", *EAGE Conference and Exhibition incorporating SPE EUROPEC 2011*, Vienna, Austria, Expanded Abstracts, (2011), 2 pgs.

Hibbs, Andrew et al., "New Electromagnetic Sensors for Magnetotelluric and Induced Polarization Geophysical Surveys", *SEG Annual Meeting, Expanded Abstracts*, (2012), 5 pgs.

Grard, R. et al., "A Mobile Four-Electrode Array and Its Application to the Electrical Survey of Planetary Grounds At Shallow Depths", *Journal of Geophysical Research*, vol. 96, No. B3, (Mar. 10, 1991), pp. 4117-4123.

Kiessling, Dana et al., "Geoelectrical Methods for Monitoring Geological CO2 Storage: First Results From Cross-Hole and Surface-Downhole Measurements From the CO2SINK Test Site At Ketzin (Germany)", *International Journal of Greenhouse Gas Control*, 4, (2010), pp. 816-826.

Kuras, Oliver et al., "Fundamentals of the Capacitive Resistivity Technique", *Geophysics*, vol. 71, No. 3 (May-Jun. 2006), (2006), pp. G135-G152.

Kuras, Oliver et al., "Capacitive Resistivity Imaging With Towed Arrays", *Journal of Engineering and Environmental Geophysics*, vol. 12, Issue 3, (2007), pp. 267-279.

Labrecque, Douglas et al., "Assessment of Measurement Errors for Galvanic-Resistivity Electrodes of Different Composition", *Geophysics*, vol. 73, No. 2 (Mar.-Apr. 2008), (2008), pp. F55-F64.

MacNae, James et al., "Near-Surface Resistivity Contast Mapping With a Capacitive Sensor Array and an Inductive Source", *Geophysics*, vol. 76, No. 2, (Mar.-Apr. 2011), (2011), pp. G13-G23.

Mwenifumbo, C. J. et al., "Field Evaluation of a New Borehole Resistivity Probe Using Capacitive Electrodes", *Proceedings of the Symposium on the Applications of Geophysics to Engineering and Environmental Problems*, (1999), pp. 859-867.

Mwenifumbo, C. Jonathan et al., "Capacitive Conductivity Logging and Electrical Stratigraphy in a High-Resistivity Aquifer, Boise Hydrogeophysical Research Site", *Geophysics*, vol. 74, No. 3 (May-Jun. 2009), (2009), pp. E125-E133.

Panissod, Cedric et al., "Recent Developments in Shallow-Depth Electrical and Electrostatic Prospecting Using Mobile Arrays", *Geophysics*, vol. 63, No. 5 (Sep.-Oct. 1998), (1998), pp. 1542-1550.

Petiau, Gilbert "Second Generation of Lead-Lead Chloride Electrodes for Geophysical Applications", *Pure and Applied Geophysics*, 157, (2000), pp. 357-382.

Shima, Hiromasa et al., "Developments of Non-Contact Data Acquisition Techniques in Electrical and Electromagnetic Explorations", *Journal of Applied Geophysics*, 35, (1996), pp. 167-173.

Shima, Hiromasa et al., "Fast Imaging of Shallow Resistivity Structures Using a Multichannel Capacitive Electrode System", *SEG Annual Meeting, Expanded Abstracts*, pp. 377-380.

Tondel, Richard et al., "Reservoir Monitoring in Oil Sands: Developing a Permanent Cross-Well System", *SEG Annual Meeting, Expanded Abstracts*, (2011), pp. 4077-4081.

Douma, Marten et al., "A Capacitive-Coupled Ground Resistivity System for Engineering and Environmental Applications: Results of Two Canadian Field Tests", *SEG Annual Meeting, Expanded Abstracts*, (1994), pp. 559-561.

Carrigan, Charles R. et al., "Electrical resistance tomographic monitoring of CO2 movement in deep geologic reservoirs", *International Journal of Greenhouse Gas Control*, doi: 10.1016/j.ijggc. 2013.04.016, (2013), pp. 401-408.

Tabbagh, Alain et al., "Determination of Electrical Properties of the Ground At Shallow Depth With an Electrostatic Quadrupole: Field Trials on Archaeological Sites," *Geophysical Prospecting*, 41, (1993), pp. 579-597.

Timofeeev, V.M. et al., "A New Ground Resistivity Method for Engineering and Environmental Geophysics", *Proceedings of the Symposium on the Applications of Geophysics to Engineering and Environmental Problems*, (1994), pp. 701-715.

Tondel, Richard et al., "Remote Reservoir Monitoring in Oil Sands: From Feasibility Study to Baseline Datasets," *CSEG-CSPG-CWLS GeoConvention, Expanded Abstracts*, (2013), 5 pgs.

(56) References Cited

OTHER PUBLICATIONS

PCT International Search Report & Written Opinion, dated Dec. 15, 2014, Appl No. PCT/US2014/031731, "Permanent EM Monitoring Systems Using Capacitively Coupled Source Electrodes," Filed Mar. 25, 2014, 14 pgs.
Australian Application Serial No. 2014388388, Second Examination Report dated Sep. 11, 2017, 3 pages.
European Patent Application No. 14887671.7, Extended European Search Report dated Sep. 6, 2017, 8 pages.
Canadian Application Serial No. 2,940,029, First Office Action dated May 24, 2017, 4 pages.
Australian Application Serial No. 2014388388; Examinaion Report #1; Mar. 30, 2017, 3 pages.
Canadian Application Serial No. 2,940,029; Second Office Action; May 24, 2018, 5 pages.
CA Application Serial No. 2,940,029, Office Action, dated Apr. 24, 2019, 5 pages.
European Application Serial No. 14887671.7;Communication Pursuant to Article 94(3); Apr. 12, 2019, 5 pages.

* cited by examiner

PERMANENT EM MONITORING SYSTEMS USING CAPACITIVELY COUPLED SOURCE ELECTRODES

BACKGROUND

Oilfield operators are faced with the challenge of maximizing hydrocarbon recovery within a given budget and timeframe. While they perform as much logging and surveying as feasible before and during the drilling and completion of production wells and, in some cases, injection wells, the information gathering process does not end there. It is desirable for the operators to track the movement of fluids in and around the reservoirs, as this information enables them to adjust the distribution and rates of production among the producing and/or injection wells to avoid premature water breakthroughs and other obstacles to efficient and profitable operation. Moreover, such information gathering further enables the operators to better evaluate treatment and secondary recovery strategies for enhanced hydrocarbon recoveries.

The fluid saturating the formation pore space is often measured in terms of a hydrocarbon fraction and a water fraction. Due to the solubility and mobility of ions in water, the water fraction lends itself to indirect measurement via a determination of formation resistivity. Thus the ability to remotely determine and monitor formation resistivity is of direct relevance to long term reservoir monitoring, particularly for enhanced oil recovery (EOR) operations with water flooding and/or $CO_2$ injection. Hence, a number of systems have been proposed for performing such remote formation resistivity monitoring.

One such proposed system for long-term monitoring employs "electrical resistivity tomography" or "ERT". The proposed systems employ galvanic electrodes which have been shown to suffer from variable and generally degrading contact resistance with the formation due to electrochemical degradation of the electrode, resulting in poor performance which is further exacerbated by temperature drift and electrochemical noise. In addition to limiting the useful system lifetime, such effects directly impair data quality and survey repeatability. See, e.g., J. Deceuster, O. Kaufmann, and V. Van Camp, 2013, "Automated identification of changes in electrode contact properties for long-term permanent ERT monitoring experiments" Geophysics, vol. 78 (2), E79-E94. Such difficulties are most strongly associated with ERT on steel casing. See, e.g., P. Bergmann, C. Schmidt-Hattenberger, D. Kiessling, C. Rucker, T. Labitzke, J. Henninges, G. Baumann, and H. Schutt, 2012, "Surface-downhole electrical resistivity tomography applied to monitoring of CO2 storage at Ketzin, Germany" Geophysics, vol. 77 (6), B253-B267. See also R. Tondel, J. Ingham, D. LaBrecque, H. Schutt, D. McCormick, R. Godfrey, J. A. Rivero, S. Dingwall, and A. Williams, 2011, "Reservoir monitoring in oil sands: Developing a permanent cross-well system" Presented at SEG Annual Meeting, San Antonio. Thus, it has been preferred for ERT systems to be deployed on insulated (e.g., fiberglass) casing. However, insulated casing is generally impractical for routine oilfield applications.

Crosswell electromagnetic (EM) tomography systems have been proposed as a non-permanent solution to reservoir monitoring. See, e.g., M. J. Wilt, D. L. Alumbaugh, H. F. Morrison, A. Becker, K. H. Lee, and M. Deszcz-Pan, 1995, "Crosswell electromagnetic tomography: System design considerations and field results" Geophysics, 60 (3), 871-885. The proposed crosswell EM tomography systems involve the wireline deployment of inductive transmitters and receivers in separate wells. However, the wells in a typical oilfield are cased with carbon steel casing, which is both highly conductive and magnetically permeable. Hence, the magnetic fields external of the casing are greatly reduced. Moreover, the casing is typically inhomogeneous, having variations in casing diameter, thickness, permeability, and conductivity, resulting from manufacturing imperfections or from variations in temperature, stress, or corrosion after emplacement. Without precise knowledge of the casing properties, it is difficult to distinguish the casing-induced magnetic field effects from formation variations. See discussion in E. Nichols, 2003, "Permanently emplaced electromagnetic system and method of measuring formation resistivity adjacent to and between wells" U.S. Pat. No. 6,534,986.

Despite the potential of these and other proposed downhole electric-field-sensing based techniques (e.g., galvanic resistivity monitoring, electrical impedance tomography, induced polarization monitoring, controlled-source electromagnetic (CSEM)), their use is restricted by the lack of an adequate solution to the electrochemical degradation issue.

BRIEF DESCRIPTION OF THE DRAWINGS

Accordingly, there are disclosed herein various permanent EM systems and methods implementing capacitively coupled source electrodes to generate current downhole. In the drawings.

Figure 1:
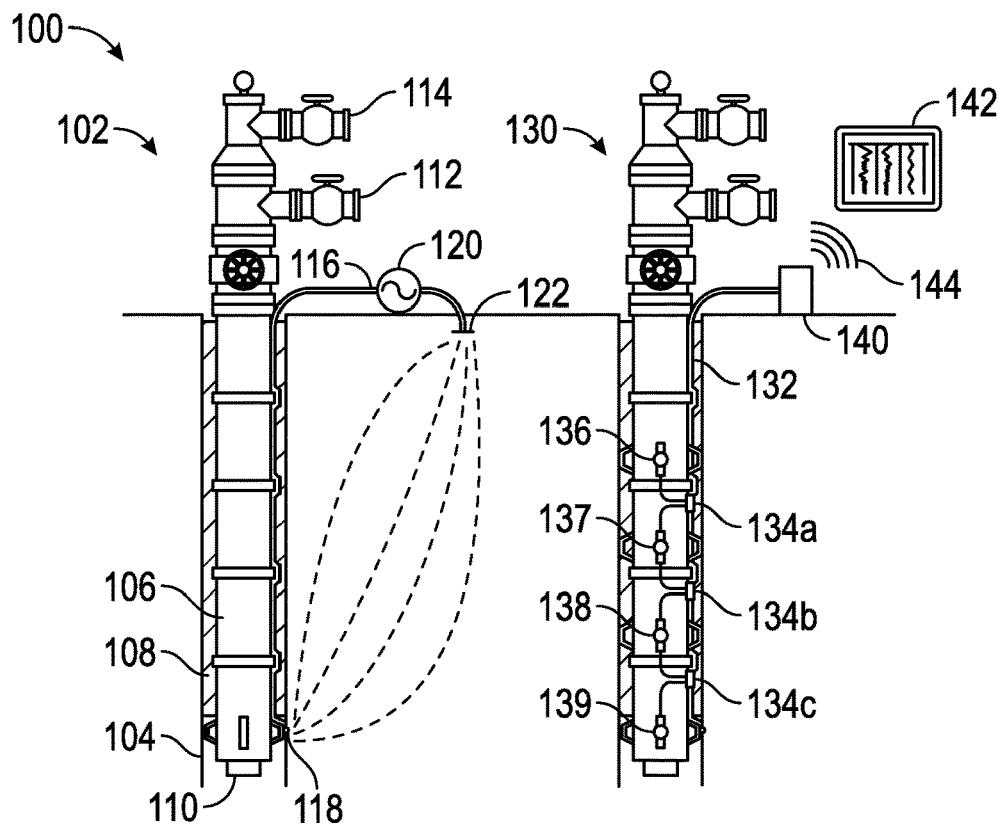
FIG. 1 shows an illustrative permanent EM monitoring system for a reservoir.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Certain disclosed system and method embodiments provide a permanent electromagnetic (EM) monitoring system. The EM system includes a casing string having a source electrode coupled thereto and cemented inside a borehole drilled in a formation. An electrically insulating layer is arranged on an outer surface of the source electrode to provide a capacitive coupling between the source electrode and the formation. The source electrode is driven relative to a return electrode by an alternating current (AC) power supply, thereby injecting current into the formation via the capacitive coupling. A processing unit may determine properties of the formation based on spatially diverse sensor measurements and/or on the relationship between the current and the voltage between the electrodes.

The return electrode may be arranged at the Earth's surface, or alternatively attached to the same casing string as the source electrode. In further embodiments, the return electrode may be attached to another casing string in a different borehole. Additional source electrodes and/or additional return electrodes may be provided to increase the spatial diversity of the formation property measurements, and multiple measurement frequencies may be employed to yield additional measurement information. The source electrode is preferably, though not necessarily, insulated from the casing string. In some embodiments the source electrode may take the form of an elongated conductor encased by the electrically insulating layer, where the electrically insulating layer has one or more regions of reduced thickness which accordingly concentrate the capacitive coupling and injected current.

To provide some context for the disclosure, FIG. 1 shows an illustrative permanent EM monitoring system 100 for a reservoir, with a first well 102 having a casing string 106 set within a borehole 104 and secured in place by a cement sheath 108. Inside the casing string 106, a production tubing string 110 defines an annular flow path (between the walls of the casing string and the production tubing string) and an inner flow path (along the bore of the production tubing string). Wellhead valves 112 and 114 provide fluid communication with the bottom-hole region via the annular and inner flow paths, respectively. Well 102 may function as a production well, an injection well, or simply as a formation monitoring well.

Well 102 includes an armored cable 116 strapped to the outside of the casing string 106 to provide an insulated electrical connection to a source electrode 118 also attached to the casing string 106 downhole. As the casing string 106 has been cemented in place, the source electrode 118 is permanently fixed in place, thereby removing positional changes as a variable from measurements that are acquired over the life of the reservoir. A power supply 120 operates as an AC voltage or current source to drive a current between the source electrode 118 and one or more return electrodes 122 located at a distance from the source electrode 118 and the well 102. In one embodiment, as depicted, the power supply 120 drives current to the source electrode 118 via the armored cable 116. Alternatively, current may be driven to the source electrode 118 via the casing string 106 if adequate electrical isolation exists between the casing string and the formation. In further embodiments, the source electrode 118 may be powered via a downhole power supply such as a battery pack or downhole power generator.

To best emulate the behavior of an electrical monopole, additional distributed return electrodes 122 may be employed. (In some systems, the return electrodes 122 may include the casing string in another well.) As the casing string 106 is expected to be steel or another conductive material that might tend to "short circuit" the measurement and thereby prevent adequate current flow through the formation regions of interest, the source electrode 118 is preferably insulated from the casing string 106, and the cement 108 may be formulated to create a sheath that is relatively nonconductive (compared to the formation). To further promote current flow into the formation, a centralizer fin, arm, or spring (not shown) may optionally be provided to maintain contact or at least proximity between the source electrode 118 and the borehole wall.

In the same or in a separate well 130, another cable 132 is strapped to the outside of the casing string. It includes an array of optical transducers 134a, 134b, 134c, which can be interrogated via an optical fiber in cable 132. Optical transducers 134 are each coupled to a pair of separated sensing electrodes 136, 137, 138, and 139. In FIG. 1, optical transducer 134a is coupled between sensing electrodes 136 and 137, optical transducer 134b is coupled between sensing electrodes 137 and 138, and optical transducer 134c is coupled between sensing electrodes 138 and 139. Such use of shared sensing electrodes is optional, and in at least some alternative embodiments, each optical transducer is coupled to a dedicated pair of sensing electrodes. The electrode spacing is a design parameter that can be adjusted to the desired application. Larger spacings provide larger investigation volumes at the cost of reduced spatial resolution.

As with source electrode 118, the sensing electrodes 136-139 are preferably insulated from the casing string and may be held in contact or proximity with the borehole wall by a centralizer element or other mechanism. Such insulation can be provided by making the casing (at least in the proximity of the sensing electrode) from a non-conductive material such as fiberglass. Alternatively, a layer of such non-conductive material may surround the casing in the vicinity of the sensing electrode and/or serve as an insulating substrate for the sensing electrode. (Similar measures may be employed on casing string 106 to electrically isolate the source electrode 118 from the casing.)

Electric fields translate into potential differences between the sensing electrodes. The optical transducers 134 employ this potential difference to modify some property of the light that propagates along cable 132. An interface unit 140 includes an interrogator that transmits light along cable 132 and analyzes the return signal to detect the effects of optical transducers 134a-c and extract the corresponding electric field measurements. Interface unit 140 is further coupled to a wired or wireless network 144 to communicate the measurement information to a processing unit 142 for further analysis and display to a user.

Processing unit 142 may be a computer in tablet, notebook, laptop, or portable form, a desktop computer, a server or virtual computer on a network, a mobile phone, or some combination of like elements that couple software-configured processing capacity to a user interface. The processing may include compiling a time series of measurements to enable monitoring of the time evolution, and may further include the use of a geometrical model of the reservoir that takes into account the relative positions and configurations of the transducer modules and inverts the measurements to obtain one or more parameters. Those parameters may include a resistivity distribution and an estimated water saturation. In some cases, the processing unit 142 may determine a formation property based at least in part on a relationship, such as a ratio, between a voltage and current between the source electrode 118 and return electrodes 122.

The processing unit 142 may further enable the user to adjust the configuration of the system, modifying such parameters as firing rate of the source electrode 118, firing sequence, transmit amplitudes, transmit waveforms, transmit frequencies, receive filters, and demodulation techniques. In some contemplated system embodiments, the computer further enables the user to adjust injection and/or production rates to optimize production from the reservoir.

Figure 2:
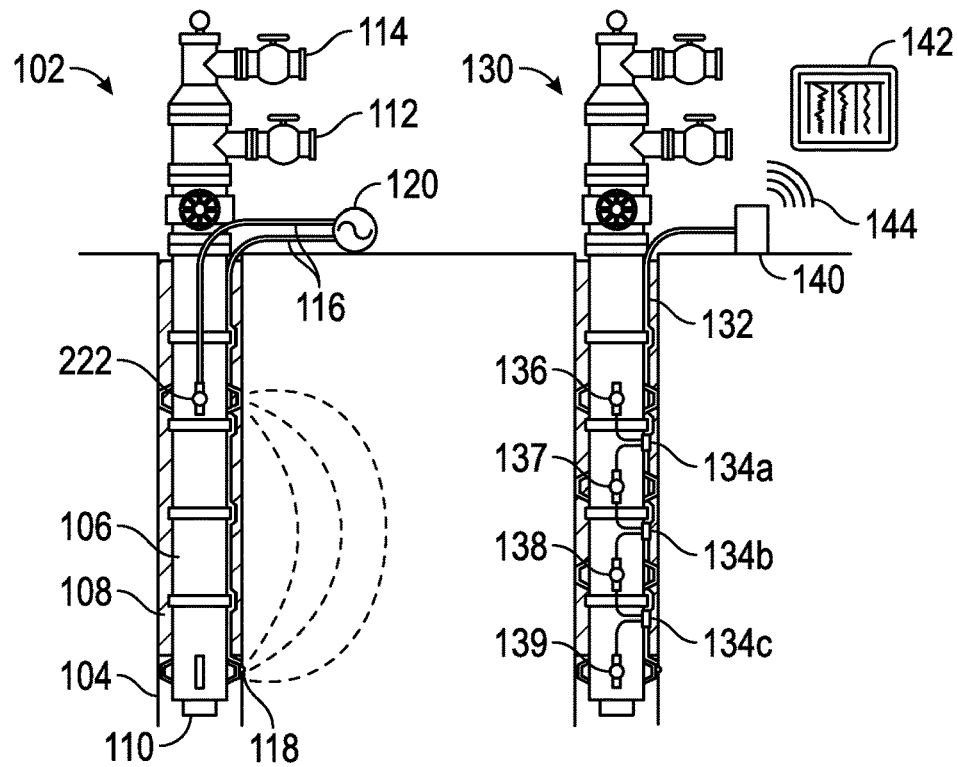
FIG. 2 shows a related EM monitoring system configuration with a second downhole electrode.

FIG. 2 shows a related EM monitoring system configuration with a downhole return electrode 222 spatially separated from the source electrode 118. Power supply 120 is coupled between the source and return electrodes 118, 222 by cables 116 to drive a current between the downhole electrodes. Both electrodes 118, 222 are preferably in contact or proximity to the borehole 104 wall and insulated from the casing 106, so as to promote current flow through the formation. The two electrode configuration enables the transmitter to emulate an electric dipole. As before, an array of sensing electrodes 136-139 may be located in the same or a nearby well to obtain responsive electric field measurements.

As explained in the background section, the use of galvanic electrodes leads to electrochemical effects that may obscure and degrade the desired signal generation from the source electrodes 118, 222. Where the formation fluids contact the solid metal (or metal/metal-salt such as Ag/AgCl), a double-layer contact region forms to provide for the transition from electronic conduction in the metal to ionic conduction in the formation. The electrochemistry of this double-layer is complex, but invariably results in a non-trivial resistance to current flow. Moreover, the impedance will vary with time, temperature, and ionic species concentrations.

Figure 3:
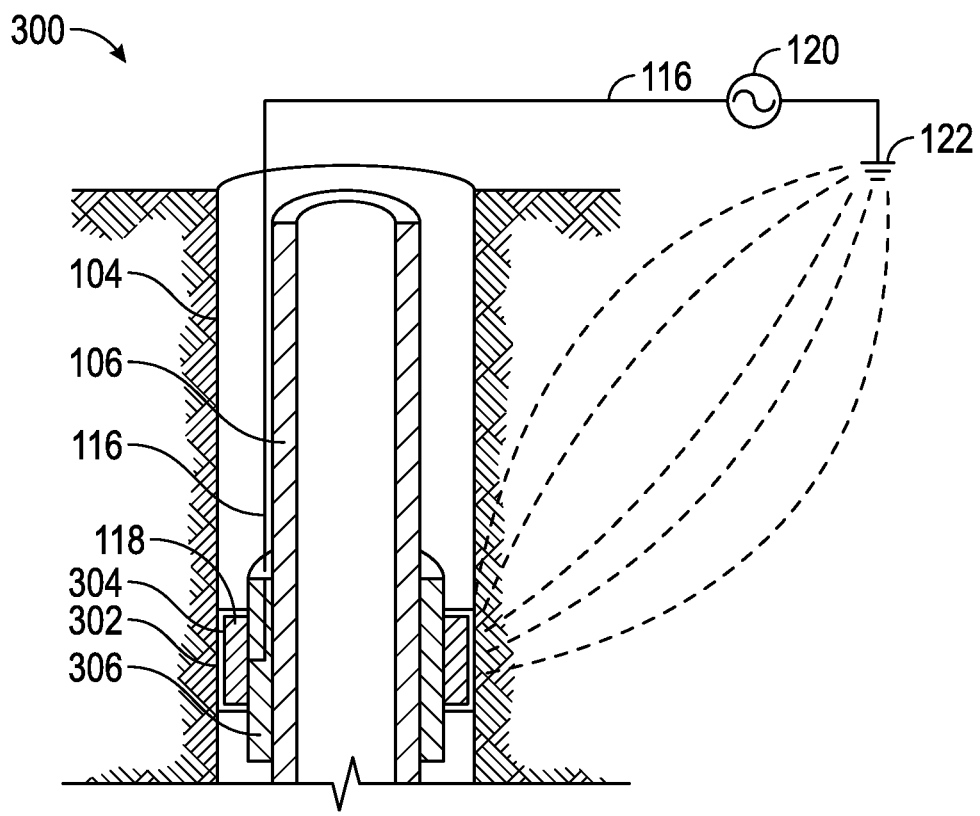
FIG. 3 shows an enlarged cross-sectional view of a source electrode coupled to a casing string downhole.

FIG. 3 is an enlarged cross-sectional view of the source electrode 118 coupled to the casing string 106 cemented within the borehole 104. The configuration depicted may be similar to the well system 102 of FIG. 1 and therefore may be best understood with reference thereto, where like numerals represent like elements that will not be described again in detail. More specifically, FIG. 3 includes the source electrode 118 arranged downhole and the return electrode 122 at the earth's surface, with the power supply 120 arranged therebetween.

An electrically insulating layer 302 is disposed on an outer surface 304 of the source electrode 118 (i.e., the surface of the source electrode 118 otherwise exposed to the cement and/or formation fluids). In some embodiments, the electrically insulating layer 302 may be a treatment or chemical coating on the outer surface 304 to reduce or substantially prevent reactivity with formation fluids. Such treatments also create an electrically insulating layer that prevents electron flow between the electrode 118 and the formation. However, a useful degree of capacitive coupling can still be achieved, particularly if the electrically insulating layer 302 is kept thin and/or formed from a material having a high dielectric constant. Preferably, such layers are extremely robust and/or self-healing to minimize the effects of any scrapes or scratches during emplacement and lifetime of the well.

The source electrode 118 may be flat, curved, or textured in nature, thereby providing an increased surface area for enhancing the capacitive coupling. For example and without limitation, the source electrode 118 may include fins, pins, ridges, projections, surface textures, and porous or expanded mesh materials. Conformal shapes (e.g., to match the borehole wall) or deformable materials may also be employed to further improve coupling between the source electrode 118 and the formation. Alternatively, as shown by the equations below, the capacitive coupling of the source electrode 118 with the formation may be increased by increasing the dielectric constant or decreasing the thickness of the electrically insulating layer 302.

The capacitive coupling of the source electrode 118 yields an effective series capacitance C which may be calculated by the following equation:

$$C = \varepsilon_r \varepsilon_0 \frac{A}{d} \quad (1)$$

where A is the surface area of the source electrode 118, d is the thickness of the electrically insulating layer 302, $\varepsilon_r$ is the dielectric value or relative permittivity of the insulating material, and $\varepsilon_0$ is the permittivity of free space. Applying Ohm's law results in equation 2:

$$I = \frac{V}{R + \frac{1}{i\omega C}} \quad (2)$$

where I is the applied current, V is the applied voltage, R is the resistance of the earth, i is the imaginary portion, and $\omega$ is the angular frequency. In some embodiments, the resistance and frequency may be chosen such that R is substantially less than $$\frac{1}{i\omega C},$$

thus resulting in the manipulated equation 3:

$$I = i\omega C V$$

substituting equation 1 for C in equation 3 results in equation 4:

$$I = i\omega \left( \varepsilon_r \varepsilon_0 \frac{A}{d} \right) V \quad (4)$$

Advantageously, as the current is independent of the formation resistivity and does not require electrochemical reactions, many of the aforementioned problems with proposed ERT implementations, such as electrode degradation, temperature drift, electrode noise, and temperature instability may be reduced or eliminated.

Various approaches are available for creating a suitable electrically insulating layer 302. For example, the source electrode 118 may be coated with a non-reactive material using a vapor coating technique (or other deposition method). Suitable non-reactive materials may include glass, ceramic, nitrides, resin, fiberglass, vulcanized rubber, and suitable polymers. Alternatively, the source electrode 118 may be formed or coated with a material that readily forms a protective oxide layer, e.g., aluminum, tantalum, and/or titanium. Elemental aluminum, for example, oxides in air and may form a 4 nm thick electrically insulating layer 302 of electrically insulating aluminum oxide, and an anodizing process may be employed to enhance this layer. Advantageously, such layers are self-healing, reforming after being scratched or scraped away. Titanium oxide may be particularly well suited for long term downhole use. Corrosive treatments may alternatively or additionally be used to further accelerate the formation of such layers.

In alternative embodiments, the system 102 may further include a second electrically insulating layer 306 arranged between the electrode 118 and the casing string 106. The second electrically insulating layer 306 may assist preventing short circuiting of the current back to the casing string 106, doing so by covering all or a portion of the casing string 106. Alternatively, the casing string 106 may be constructed of a non-conductive material, such as fiber-glass. Such embodiments may help to enable operation of the source electrode 118 and overall system 102 within industry standards, such as the Intelligent Well Interface Standards (IWIS).

Figure 4:
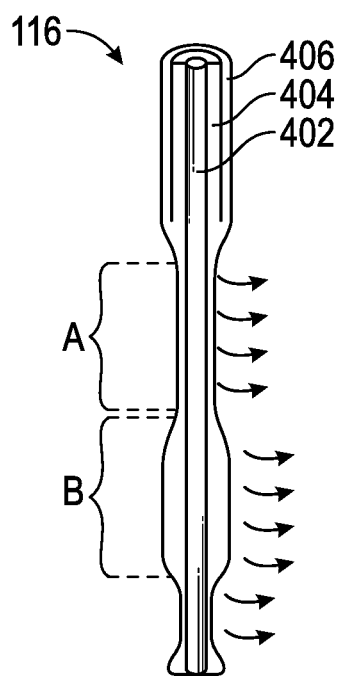
FIG. 4 illustrates an armored cable doubling as a source electrode downhole.

FIG. 4 illustrates another embodiment of the source electrode 118, where one or more regions of the armored cable 116 double as the source electrode 118. The armored cable 116 includes an elongated conductor 402 surrounded by an electrically insulating layer 404 and further surrounded in most areas by armor or some other form of a conductive shield 406. The electrically insulating layer 404 may be similar to the electrically insulating layer 302 previously discussed. As depicted, the insulation 404 may have one or more regions (e.g., region A) of reduced thickness, thereby concentrating the capacitive coupling and injected current in corresponding regions. As previously mentioned, the capacitive coupling increases as the electrically insulating layer 404 thickness (d) decreases, therefore it follows that the region A (having a reduced electrically insulating layer 404 thickness) may emit a greater current than the region B (having an increased electrically insulating layer 404 thickness). Thus, by design, the armored cable 116 may dually serve to deliver power downhole and also serve as the source electrode 118 at predetermined depths.

Figure 5:
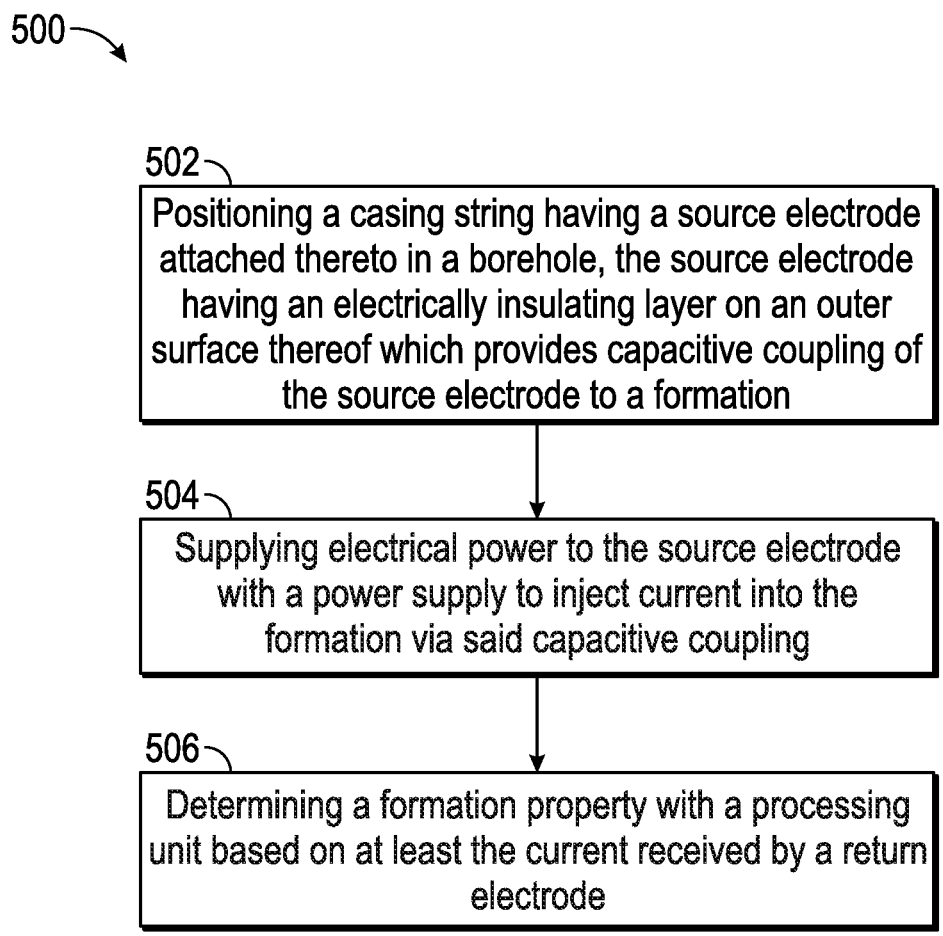
FIG. 5 is a flow chart of an illustrative permanent EM current generation method.

FIG. 5 is a flow diagram of an illustrative permanent EM monitoring method. The method begins at block 502 with a crew coupling a source electrode to a casing string. The casing string and source electrode may then be run into a borehole and cemented therein for permanent monitoring. The source electrode may have an electrically insulating layer arranged on an outer surface thereof which provides capacitive coupling between the source electrode and the formation. In some embodiments, the electrically insulating layer may be formed by oxidization, for example, when the source electrode is aluminum and interaction with air forms an aluminum oxide layer. Alternatively, the source electrode may be coated with a non-reactive material.

At block 504, power may be supplied to the source electrode, thereby injecting current into the formation via the capacitive coupling through the electrically insulating layer. The current may be received by a return electrode, and in some embodiments, the current may be focused into the formation by preventing coupling back to the casing with a second insulation layer arranged between the source electrode and the casing. The second insulation layer may extend along only the portion of casing near the source electrode or may alternatively extend the entire casing length. In other embodiments, the current may also be focused by a focus electrode additionally arranged downhole proximate to the source electrode. In further embodiments, the current may be focused by design of the source electrode, where the source electrode comprises an elongated conductor encased by the electrically insulating layer which has one or more regions of reduced thickness to concentrate the capacitive coupling and injected current in the one or more regions.

The return electrode may be arranged at the Earth's surface, on the same casing string as the source electrode, or on the casing string within another well. The return electrode is connected to a processing unit capable of determining a formation property based at least in part on the current received by the return electrode as at block 508.

Numerous other modifications, equivalents, and alternatives, will become apparent to those skilled in the art once the above disclosure is fully appreciated. For example, the source electrode may be supplemented with guard electrodes to focus the current injected from the source electrode deeper into the formation before it disperses. It is intended that the following claims be interpreted to embrace all such modifications, equivalents, and alternatives where applicable.

Embodiments disclosed herein include:

A: A permanent electromagnetic (EM) monitoring system that includes a casing string positioned inside a borehole penetrating a formation, a source electrode attached to the casing, an electrically insulating layer on an outer surface of the source electrode that provides a capacitive coupling of the source electrode to the formation, a power supply coupled to the source electrode which injects electrical current into the formation via the capacitive coupling, and a processing unit that determines a formation property based on at least the current received by a return electrode.

B: A permanent electromagnetic (EM) monitoring method that includes positioning a casing string in a borehole, said casing string having a source electrode attached thereto, electrically insulating said source electrode with an electrically insulating layer on an outer surface of the source electrode which provides capacitive coupling of said source electrode to the formation, supplying electrical power to the source electrode with a power supply to inject current into the formation via said capacitive coupling, thereby producing a voltage, and determining a formation property with a processing unit based on at least the current received by a return electrode.

Each of embodiments A and B may have one or more of the following additional elements in any combination: Element 1: A return electrode coupled to the power supply, and a processing unit that determines a formation property based at least in part on a relationship between the current and a voltage between the source and return electrodes. Element 2: The processing unit further incorporates measurements from one or more sensing electrodes to determine the formation property. Element 3: The power supply is coupled to a return electrode that provides a remote ground point at the Earth's surface. Element 4: The power supply is coupled to a return electrode attached to said casing string. Element 5: The power supply is coupled to a return electrode attached to another casing string in a different borehole. Element 6: The source electrode is textured to provide increased surface area for enhancing the capacitive coupling. Element 7: The electrically insulating layer includes a material that is substantially non-reactive with fluids in the formation. Element 8: The source electrode includes a conductive material and the electrically insulating layer is an oxide compound of the conductive material. Element 9: The casing string is electrically insulated from the formation or comprises a non-conductive material. Element 10: A second electrically insulating layer arranged between the source electrode and the casing string. Element 11: The source electrode is part of a multi-electrode configuration having at least one focus electrode proximate to the source electrode. Element 12: The source electrode comprises an elongated conductor encased by the electrically insulating layer, and where the electrically insulating layer has one or more regions of reduced thickness to concentrate the capacitive coupling and injected current in the one or more regions.

Element 13: Where determining the formation property with the processing unit further comprises incorporating measurements from one or more sensing electrodes. Element 14: Oxidizing the source electrode with an oxide compound, thereby forming the electrically insulating layer. Element 15: Insulating the source electrode from the casing with a second electrically insulating layer arranged therebetween. Element 16: Electrically insulating the casing from the formation. Element 17: Focusing the current with a focus electrode arranged proximate to the source electrode.

What is claimed is:

1. An electromagnetic (EM) monitoring system, comprising:

a casing string positioned inside a borehole penetrating a formation;

a source electrode having a first side surface that is fixedly attached to an exterior surface of the casing string and positioned between the casing string and the formation, the source electrode having a second side surface opposite the first side surface and facing the formation;

a cable that couples the source electrode to a power supply, wherein the cable comprises an elongated conductor encased by an electrically insulating layer having one or more regions of reduced thickness along the length of the elongated conductor; and an electrically insulating layer on the second side surface that provides a capacitive coupling of the source electrode to the formation.

2. The EM monitoring system of claim 1, further comprising a power supply coupled to the source electrode, such that the source electrode is configured to inject electrical current into the formation via the capacitive coupling, a return electrode coupled to the power supply; and a processing unit that determines a formation property based at least in part on a relationship between said electrical current and a voltage between the source and return electrodes.

3. The EM monitoring system of claim 1, further comprising a power supply coupled to the source electrode, wherein the power supply is coupled to a return electrode that provides a remote ground point at an Earth's surface.

4. The EM monitoring system of claim 1, further comprising a power supply coupled to the source electrode, wherein the power supply is coupled to a return electrode attached to said casing string.

5. The EM monitoring system of claim 1, further comprising a power supply coupled to the source electrode, wherein the power supply is coupled to a return electrode attached to another casing string in a different borehole.

6. The EM monitoring system of claim 1, wherein the electrically insulating layer on the second side surface comprises a material that is substantially non-reactive with fluids in said formation.

7. The EM monitoring system of claim 6, wherein the source electrode comprises a conductive material, and wherein the electrically insulating layer on the second side surface is an oxidized material.

8. The EM monitoring system of claim 1, wherein the casing string is electrically insulated from the formation or comprises a non-conductive material.

9. The EM monitoring system of claim 1, further comprising a second electrically insulating layer arranged between the source electrode and the casing string.

10. The EM monitoring system of claim 1, wherein said source electrode is part of a multi-electrode configuration having at least one focus electrode proximate to the source electrode.

11. The EM monitoring system of claim 1, further comprising:

a component coupled to the source electrode to cause the source electrode to maintain contact with a wall of the borehole, the component consisting of at least one of a centralizer fin, an arm, and a spring.

12. The EM monitoring system of claim 1, wherein the electrically insulating layer encasing the elongated conductor is surrounded by a conductive shield.

13. The EM monitoring system of claim 1, wherein the first side surface of the source electrode is fixedly attached to the exterior surface of the casing string via an insulation layer disposed between the source electrode and the exterior surface of the casing string.

* * * * *